Figure 1:
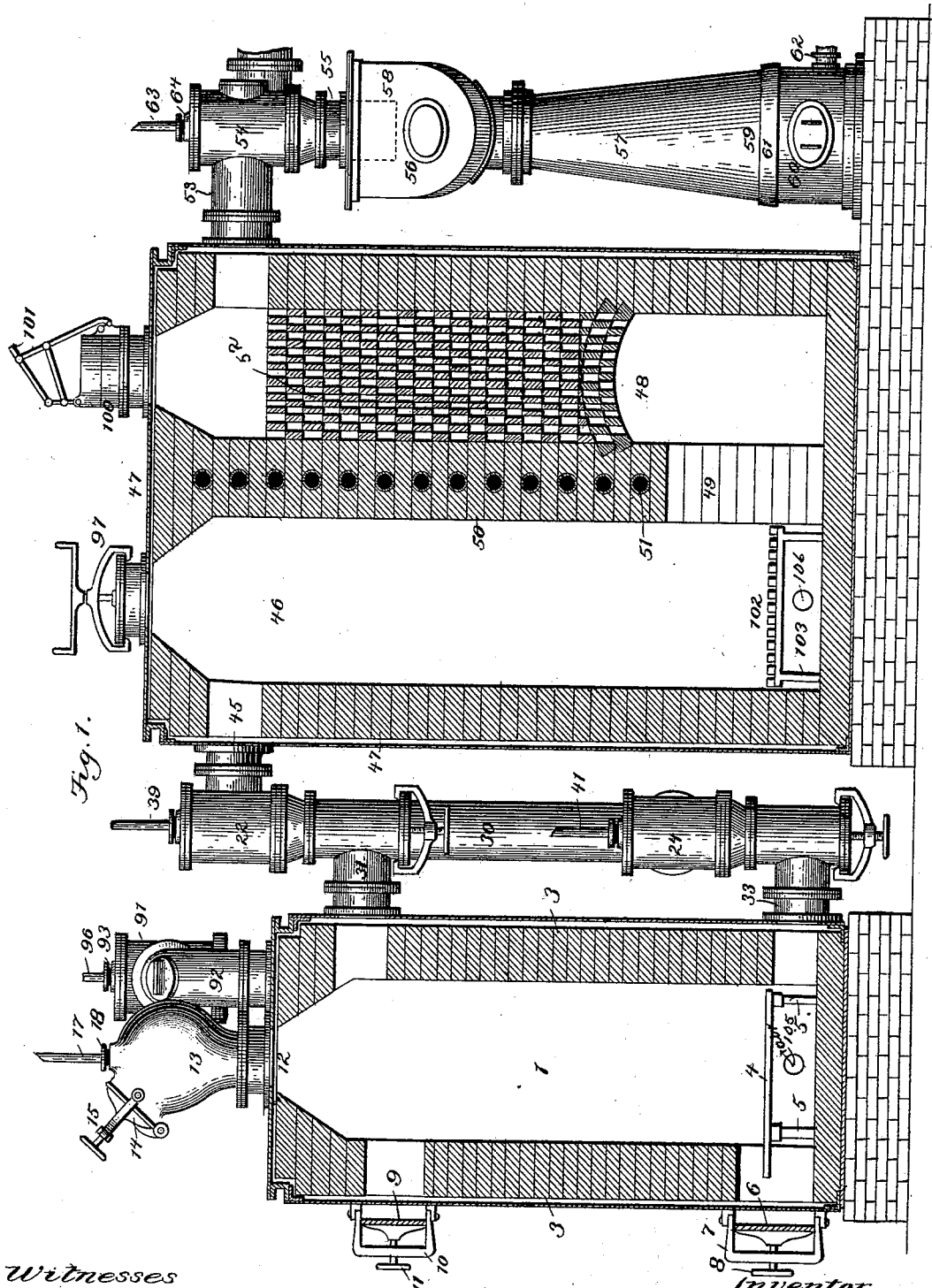

(No Model.) 4 Sheets—Sheet 1.

W. T. BATE.
GAS GENERATING APPARATUS.

No. 499,155. Patented June 6, 1893.

Witnesses
Edwin L. Bradford
Geo. E. Stw

Inventor
William T. Bate
By Chas. E. Barber
Attorney.

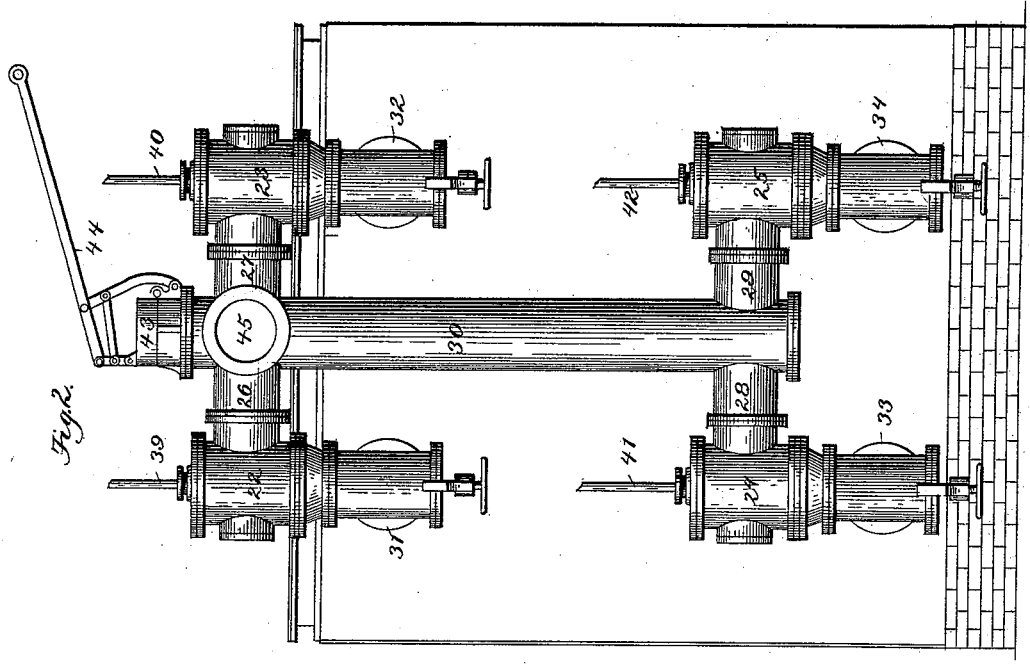

(No Model.) 4 Sheets—Sheet 3.
W. T. BATE.
GAS GENERATING APPARATUS.
No. 499,155. Patented June 6, 1893.
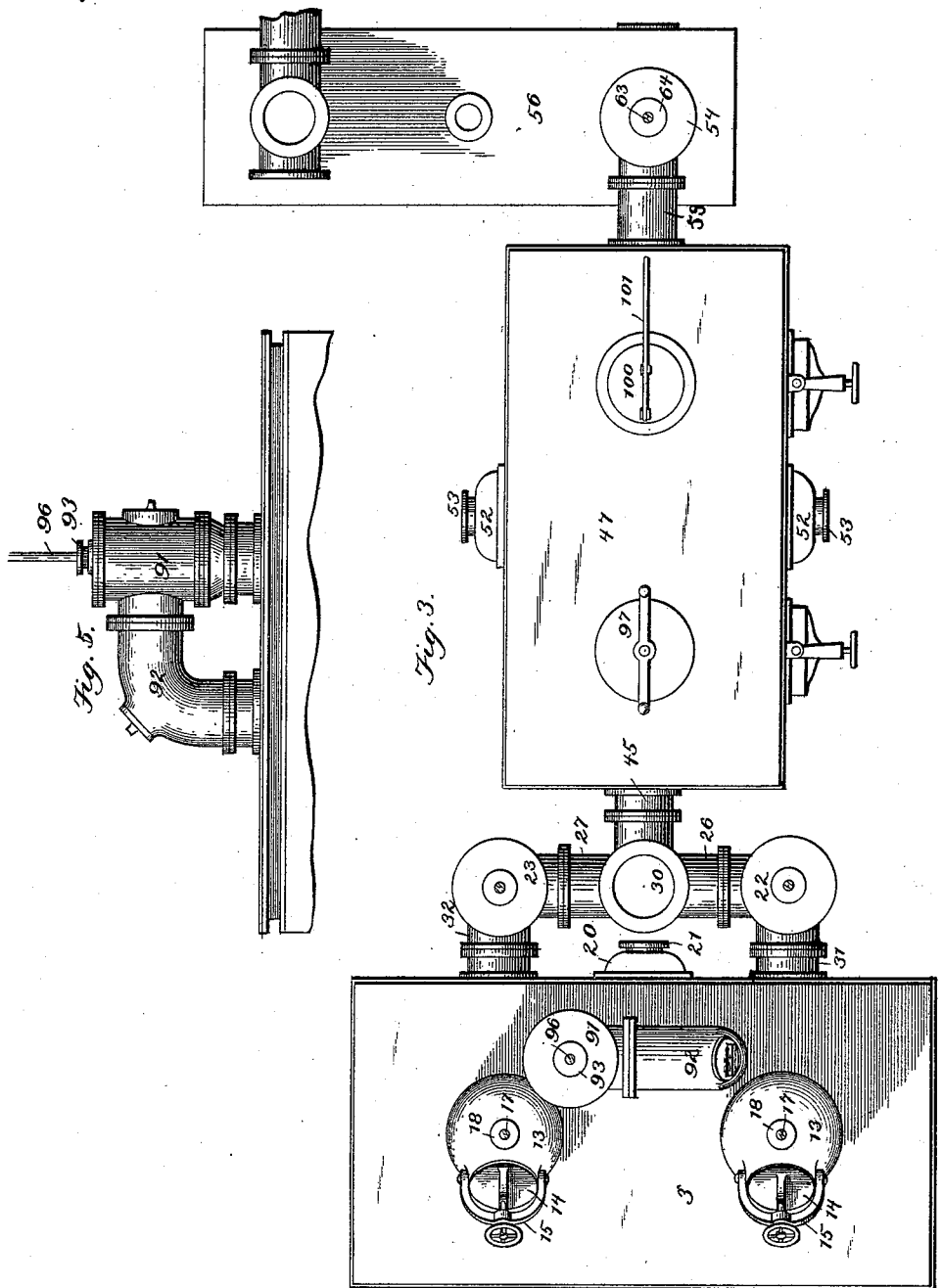
WITNESSES:
Edwin L Bradford
Geo. E. Stees
INVENTOR
Wm T. Bate
BY
Chas. E. Barber
ATTORNEY.

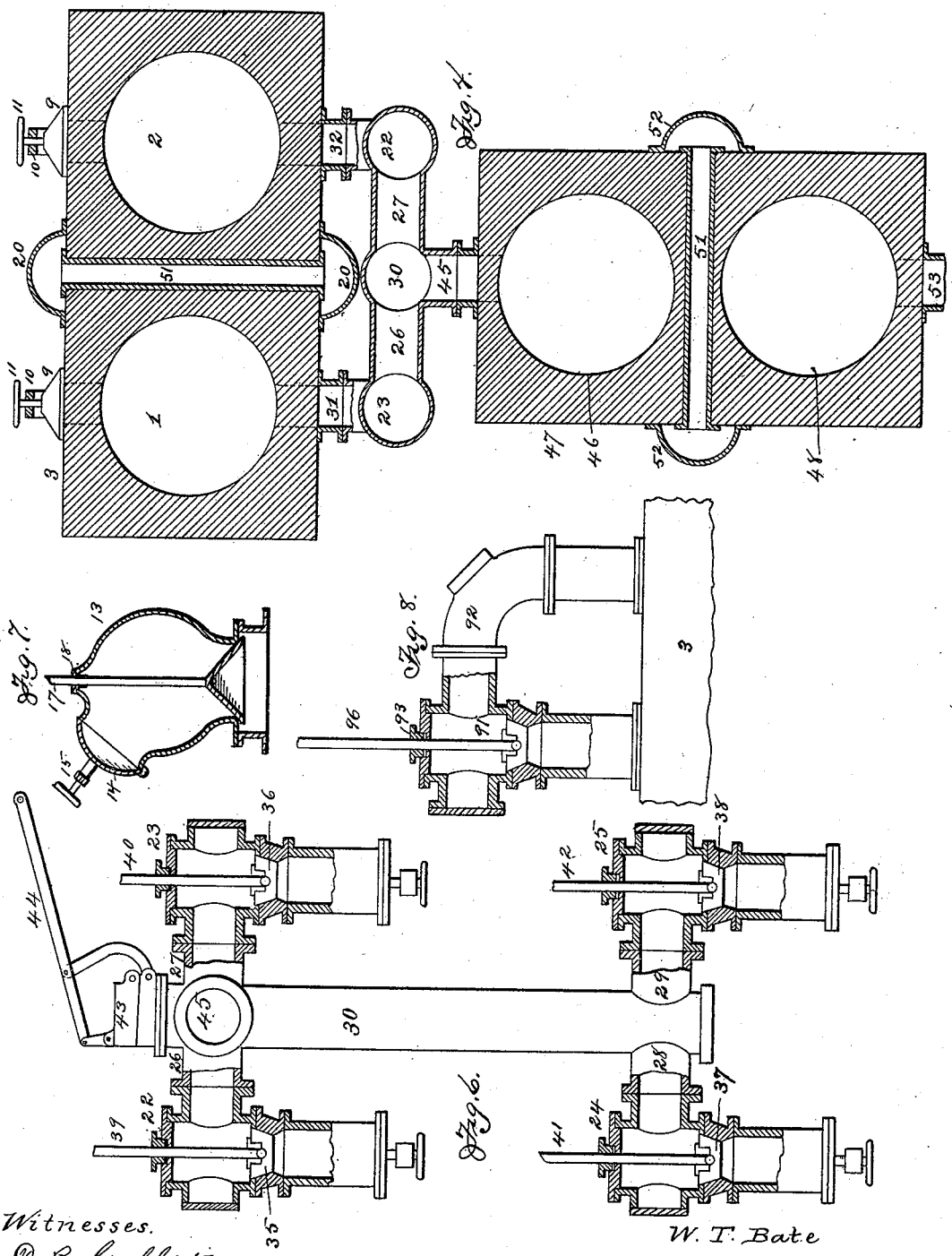

UNITED STATES PATENT OFFICE.

WILLIAM T. BATE, OF CONSHOHOCKEN, PENNSYLVANIA.

GAS-GENERATING APPARATUS.

SPECIFICATION forming part of Letters Patent No. 499,155, dated June 6, 1893.

Application filed May 25, 1891. Serial No. 394,040. (No model.)

*To all whom it may concern:*

Be it known that I, WILLIAM T. BATE, a citizen of the United States, residing at Conshohocken, in the county of Montgomery and State of Pennsylvania, have invented a new and useful Improvement in Gas-Generating Apparatus, of which the following is a specification.

This invention relates to certain improvements in apparatus for the manufacture of gas, and it has for its objects to produce the gas rapidly and in large volumes; to effect the thorough conversion of the gas producing elements, into gas, for fuel, illuminating and general purposes; to eliminate, so far as possible the ammonia, nitrogen and other impurities and diluents from the gas.

The invention consists, primarily, in the combination with two producers, having proper appliances for charging with coal or other gas producing material, of a stand pipe having horizontal, lateral branches near its upper and lower ends, which connect respectively with a series of four valve chambers, which communicate by means of lateral horizontal branches with the upper and lower portions of the producers, and are provided with valves whereby the producers may be operated alternately or in conjunction with each other for the generation of gas.

The invention further consists in the combination with the connecting branch pipes of the upper valve chambers and stand pipe, of a converter connected with said pipe, and a fixing chamber communicating with the converter, whereby the gaseous vapors are converted into gas, the thorough conversion into a fixed gas being insured by passing the gas through the fixing chamber as more fully hereinafter set forth.

The invention also consists in certain minor details of construction, which will be more fully hereinafter described and specifically defined in the claims.

In the accompanying drawings forming part of this specification and in which like reference numerals indicate like parts; Figure 1 represents a view partly in vertical section and partly in side elevation of an entire plant embracing the various features of my invention, with the exception of the gas holder. Fig. 2 represents a vertical sectional view showing the twin producers and connecting pipes and valves. Fig. 3 represents a top view of the entire plant. Fig. 4 represents a horizontal section through the producer and converter. Fig. 5 represents a detached side view of the valve chambers and connecting pipes by which the producers are connected with each other. Fig. 6 is a view similar to Fig. 2, showing the valve chambers and valves in section. Fig. 7 represents a vertical section through one of the charging chambers, and Fig. 8 is a side view, partly in section, of the valve chamber shown in Fig. 5.

Referring to the drawings the reference numerals 1 and 2 indicate twin producers which consist of vertical chambers precisely alike and formed in the same body or structure 3, which is preferably constructed of brick-work or masonry. The said chambers, near their bases are provided with grates or platforms 4 supported on standards 5 the said grates or platforms serving to support the coal or other gas producing material during the generation of the gas. Opposite said platforms openings are made in the side walls of the chambers, which are closed by means of covers 6 which are held in place by the ordinary retort fastenings, or swiveled yokes 7 and screws 8. The said openings furnish means for withdrawing the non-convertible residues from the chambers. The upper portions of the chambers are provided with similar openings having covers 9, fastening yokes 10 and screws 11, for the purpose of charging the producers directly. The upper portions of the chambers are contracted toward their centers, and connect by means of throats 12 with charging chambers 13, which are approximately cylindrical in shape, and are provided with openings which are closed by covers 14, held in place by the retort fastenings 15, so that the chambers may be filled with coal and securely fastened. The chambers are provided with cone valves 16 having valve rods 17 which extend through stuffing boxes 18, to prevent the escape of gas. The valves are seated at the lower ends of the charging chambers, which communicate with the chambers 1 and 2 so that when the valves are depressed the coal will be discharged into said chambers without permitting any gas to escape. The said chambers are charged with coal or other gas producing material through the charging openings which are then tightly closed by the covers and fastenings 14, 15, after which the valves 16 are opened to permit the coal to drop into the producing chambers. By this means the said chambers 1 and 2 may be recharged without stopping the operation of the apparatus. The chambers 1, 2 are also provided at the top with weighted relief valves which are open while fires are being started but are closed while gas is being produced. In the event of an explosion of gas these valves are opened by the pressure within and prevent injury to the apparatus.

The dividing wall of the chambers is provided with horizontal flues 19 which are connected at their ends by semi-cylindrical vertical flues 20, which are provided with flanged pipes 21 to which may be connected suitable pipes to supply and carry off from the said semi-cylindrical and horizontal flues, a current of air which becomes heated in its passage thus providing means for utilizing heat that would be wasted, otherwise. As these devices form part of the subject matter of an application filed by me October 23, 1891, Serial No. 409,627, and are claimed therein, no claim is made to them in the present application.

The numerals 22, 23, 24 and 25, indicate four valve chambers which are connected by branch pipes 26, 27, 28 and 29, with a stand pipe 30, near the upper and lower ends thereof. The said valve chambers, also connect with the interior of the chambers 1 and 2 by means of lateral horizontal branch pipes 31, 32, 33 and 34 near the upper and lower ends of said chambers. The valve chambers are provided with frustum valves 35, 36, 37 and 38 having valve stems 39, 40, 41 and 42, extending through stuffing boxes in the tops of the valve chambers. These valves and connections are to provide for using the producers singly and alternately, or simultaneously, as will appear in the description of the operation of the invention. The stand pipe is provided with a valve 43 at its top, and a lever 44, for the purpose hereinafter explained.

The numeral 45 indicates a short pipe which connects the upper part of the stand pipe with the converter chamber 46, in the structure 47, which is preferably constructed of brick-work or masonry. The said structure also contains a compartment 48 which communicates with the counter-chamber 46 at the bottom by means of a flue by-pass 49.

The compartments are divided by a partition wall 50 through which extend horizontal flues 51, which are connected at their ends by semicircular flues 52, which may be connected, by means of flanged pipes 53, with suitable pipes whereby a current of air may be passed through the flues, to absorb and utilize the waste heat.

The compartment 48 above the flue is provided with a perforated arch and the body above, is filled with "checker-work" 52 of fire-brick. This checker-work extends nearly to the top of the chamber, which connects above said checker-work by means of a pipe 53 with a valve chamber 54. The said valve chamber connects by a short vertical pipe 55 with a washing chamber 56 which forms no part of the invention herein described and claimed and need not therefore be described in this application. From the washing chamber the gas passes through an outlet pipe 64$^a$ to a scrubber and purifier (not shown) as usual, and from the latter to a gas holder or to the distributing mains or pipes.

The operation of my invention will be readily understood in connection with the above description and is as follows: In starting the apparatus fires are started in one or both the producers 1 and 2 and in the converting chamber 46, and are urged by blasts introduced through tuyere openings 105 and 106 under the respective grates, the upper valves and valve 100 being open. After the fires are well started the valve 100 is closed, the producing chamber or chambers are charged with gas-producing material, the doors or covers 6 and 9 are tightly closed and the valves in the valve chambers connected with stand pipe 30 are manipulated. The manipulation differs in making different kinds of gas, and I will first describe the operation of making illuminating gas from anthracite coal and oil, and afterward that of making fuel gas from bituminous coal. Suppose then that gas is to be produced in the two producers simultaneously, the fires are started and blown up as already explained. When the fires are well started and the apparatus sufficiently heated the air blasts are shut off and the valve 100 at the top of the fixing chamber is closed. The producers are now charged with coal either through the charging chambers on top of the producers or through the side openings near the top. Now close the valves 37, 38 in the lower valve chambers 24, 25 and open the valves 35, 36 in the upper valve chambers 22, 23 and introduce a jet of steam under the grate of each producer, and oil at the top. The gas produced will pass through the upper open valve chamber into the top of the converter 46 and down through the fire in the latter, whereby it is superheated and the vapors carried along are converted into gas, the whole passing from the converting chamber into the fixing chamber through the communicating passage 49 at the bottom, and then up through the checker work 52 in the upper part of the fixing chamber whereby the heat is absorbed and abstracted and the gas is converted into a fixed and permanent gas, after which it passes through the outlet 53 to the washing and scrubbing chambers where it is washed and purified as in other apparatus of this character. When the gas producing charges in the producers are exhausted the fires are again blown up and the operation described is repeated. When the two producers are to be used alternately for the continuous manufacture of gas, the operation is as follows: The fires being started in one of the producers, (say in that marked 1) and in the converter, as above described, the producer in operation is charged with coal, the valve in the valve chamber 22 is opened, and those in the chambers 23, 24 and 25 are closed. The gas then passes through the valve chamber 22 into the converter, as before explained. While the producer No. 1 is in operation a fire is started and blown up in No. 2, the relief valve A at the top being open. When the charge in No. 1 is exhausted, and the fire in No. 2, well started, the relief valve A is closed, a charge of gas producing material is introduced into No. 2, the valve 36 is opened, and the gas is passed through the valve chamber 23 into the converter. At the same time the valve 35 is closed, the relief valve B on No. 1, converter is opened, and a new fire is started in No. 1 producer by the time the charge in No. 2 is exhausted: when a charge of coal is introduced into No. 1, and so on alternately, gas being produced continuously and alternately in the two producers, one being in operation while the charge in the other is being renewed.

In making fuel gas the operation is as follows: Fires being started in the several furnace chambers as before, and one of the producers (say No. 1), charged with coal, both the valves 35, 36 in the upper valve chambers 22, 23 are closed, and the valve 38 in the lower valve chamber 25 is opened; also the valve in the chamber 91 is opened, whereby communication is established between the two producers, the gas produced in No. 1 producer passing through the communicating passage into No. 2 producer, down through the fire in the latter, through the valve chamber 25 into the stand pipe 30, up through the same into the converter, and through the converter and fixing chamber, as before. When the charge in No. 1 producer is exhausted a charge of coal is introduced into No. 2, the valve 38 is closed and the valve 37 opened, whereby the gas produced in No. 2 is caused to pass into and down through No. 1, in the same manner as before described with reference to No. 1, the two producers being thus alternately used for the continuous production of gas the same as when making illuminating gas. It is to be observed however that when making gas the upper valves 35, 36 are not used, and if the apparatus were to be used only for this purpose they might be omitted, since they are not required.

When it is desired to carbonize and make a very rich illuminating gas, it is produced in one producer and carbonized in the other, the operation being substantially the same as in making fuel gas from bituminous coal, as above explained.

When desired, by closing the valves in all but the upper valve chamber leading from one producer, that producer alone may be operated and the other held in reserve; or the producers may be operated alternately, by alternately opening the upper valves.

Having thus described my invention, what I claim, and desire to secure by Letters Patent, is—

1. In a gas producing apparatus, the combination with the twin generators and the converter chamber, of the four vertical valve chambers and their valves, the vertical stand pipe and the four pipes connecting the valve with the same, the four pipes connecting the valve chambers with the generators, and the pipe connecting the stand pipe with the converter, whereby the gas from the generators to the converter may be regulated and controlled, substantially as specified.

2. In a gas producing apparatus, the combination with the twin generators 1 and 2, provided with man holes 6 at their lower ends, and escape passages directly opposite said man holes, of the grates 4, supported on standards within said generators, in position to permit the withdrawal of the non-convertible residues from the chambers, substantially as specified.

3. The combination in a gas producing apparatus with the converter structure 47, thereof, having a combustion chamber 46, and a fixing chamber 48, connected by a flue 49, of the grate 102, supported upon standards at the bottom of said chamber, for the support of a body of fuel, substantially as and for the purposes specified.

4. The combination with the twin chambers 1 and 2, the converter having a combustion chamber 46 and a fixing chamber 48, and the pipes connecting the twin generators and the converter chamber, of the grates 4 and 102, and the blast pipes 105 and 106, whereby the combustion of fuel may be effected in the generators and converters for the manufacture of fuel gas, substantially as specified.

In testimony whereof I affix my signature in the presence of two witnesses.

WILLIAM T. BATE.

Witnesses:
 D. G. STUART,
 CHAS. E. BARBER.